United States Patent [19]

Yomogizawa et al.

[11] Patent Number: 5,014,077
[45] Date of Patent: May 7, 1991

[54] CAMERA WITH VARIABLE FOCAL LENGTH OPTICAL SYSTEM

[75] Inventors: Shinya Yomogizawa; Hideo Ikari, both of Kanagawa, Japan

[73] Assignee: Canon Kabushiki Kaisha, Tokyo, Japan

[21] Appl. No.: 436,084

[22] Filed: Nov. 9, 1989

Related U.S. Application Data

[63] Continuation of Ser. No. 366,328, Jun. 14, 1989, abandoned, which is a continuation of Ser. No. 298,766, Jan. 17, 1989, abandoned, which is a continuation of Ser. No. 214,929, Jun. 30, 1988, abandoned, which is a continuation of Ser. No. 862,680, May 13, 1986, abandoned.

[30] Foreign Application Priority Data

May 15, 1985 [JP] Japan ..................... 60-071880

[51] Int. Cl.⁵ .................. G03B 17/02; G03B 1/18; G03B 17/04
[52] U.S. Cl. .................. 354/187; 354/195.12; 354/288
[58] Field of Search ............... 354/187, 195.12, 288

[56] References Cited

U.S. PATENT DOCUMENTS

| | | | |
|---|---|---|---|
| 2,358,321 | 9/1944 | Fassin | 354/159 |
| 3,613,544 | 10/1971 | Plihal et al. | 354/199 |
| 4,002,405 | 1/1977 | Stahl | 354/195.1 X |
| 4,171,894 | 10/1979 | Yamada | 354/288 X |
| 4,410,253 | 10/1983 | Tsuboi | 354/195.1 |
| 4,522,478 | 6/1985 | Kando et al. | 354/288 |

FOREIGN PATENT DOCUMENTS

| | | | |
|---|---|---|---|
| 51-40459 | 11/1976 | Japan . | |
| 165107 | 12/1981 | Japan | 350/423 |

Primary Examiner—Donald A. Griffin
Attorney, Agent, or Firm—Toren, McGeady & Associates

[57] ABSTRACT

A camera is provided with a focal length variable photo-taking optical system in which a focal length varying cam groove for varying the focal length of the phototaking optical system and a barrel sinking cam groove for stowing the optical system inside a camera body are continuously arranged. In photographing, a focal length varying action can be accomplished continuously from moving the photo-taking optical system out of the camera body. In addition to that, a lens protecting cover is arranged to be automatically openable in association with the action for moving the photo-taking optical system out of the camera body.

179 Claims, 3 Drawing Sheets

CAMERA WITH VARIABLE FOCAL LENGTH OPTICAL SYSTEM

This is a continuation application of Ser. No. 07/366,328, filed June 14, 1989, which in turn is a continuation application of Ser. No. 07/298,766 filed Jan. 17, 1989, which in turn is a continuation application of Ser. No. 07/214,929, filed June 30, 1988, which in turn is a continuation application of Ser. No. 06/862,680, filed May 13, 1986 now abandoned.

BACKGROUND OF THE INVENTION

1. Field of the Invention

This invention relates to an improvement on a camera of the kind having a focal length variable photo-taking optical system.

2. Description of the Related Art

Figure 1:
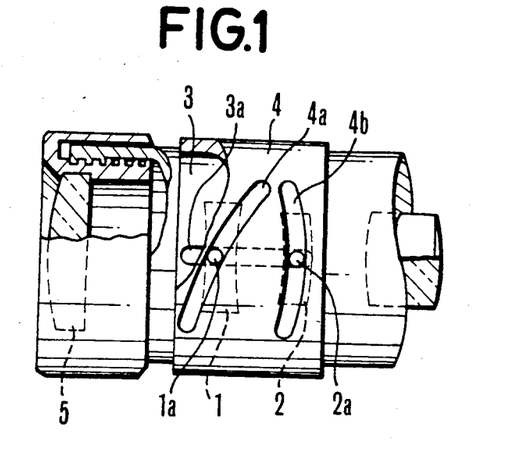
FIG. 1 shows the arrangement of a zoom lens.

Referring to FIG. 1 of the accompanying drawings, in a focal length variable optical system such as a zoom lens mounted on a camera, in general, a variator 1 and compensator 2 are arranged to be shiftable in the direction of an optical axis with rollers 1a and 2a, which are provided on the variator 1 and the compensator 2, guided by a straight moving slot 3a provided in a straight moving barrel. The rollers 1a and 2a are fitted in zooming cam grooves 4a and 4b of a cam ring 4 which is arranged to rotate on the optical axis. A zooming operation is thus arranged to be performed with the variator 1 and the compensator 2 shifted to predetermined positions according as the cam ring 4 rotates. The illustration includes a focusing lens 5.

The zoom lens of this kind is arranged to have a plurality of lenses movable relative to each other. Therefore, the zoom lens is generally larger than an ordinary photo-taking lens. With such a zoom lens incorporated in a camera, the thickness of the camera increases in the direction of the optical axis of the lens. This greatly impairs the portability of the camera.

SUMMARY OF THE INVENTION

This invention is directed to the solution of the above-stated problem. It is a first object of this invention to provide a camera having a focal length variable optical system in which a focal length varying guide part for varying the focal length of a photo-taking optical system and a barrel sinking guide part for stowing the photo-taking optical system into a camera body are continuously arranged in such a manner that, in taking a photograph, the focal length of the lens can be changed from one value over to another continuously from moving the photo-taking optical system from the inside of the camera body, so that the camera can be promptly and easily operated, while the photo-taking optical system can be readily stowed when not in use inside the camera body for improved portability of the camera.

It is a second object of this invention to provide a camera having a focal length variable optical system wherein, in addition to the arrangement described above, a lens protecting cover is arranged to be automatically openable in association with the movement of the photo-taking optical system from inside of the camera body, so that the operability of the camera can be further improved.

These and further objects and features of this invention will become apparent from the following detailed description of a preferred embodiment thereof taken in connection with the accompanying drawings.

DETAILED DESCRIPTION OF THE PREFERRED EMBODIMENT

Figure 2:
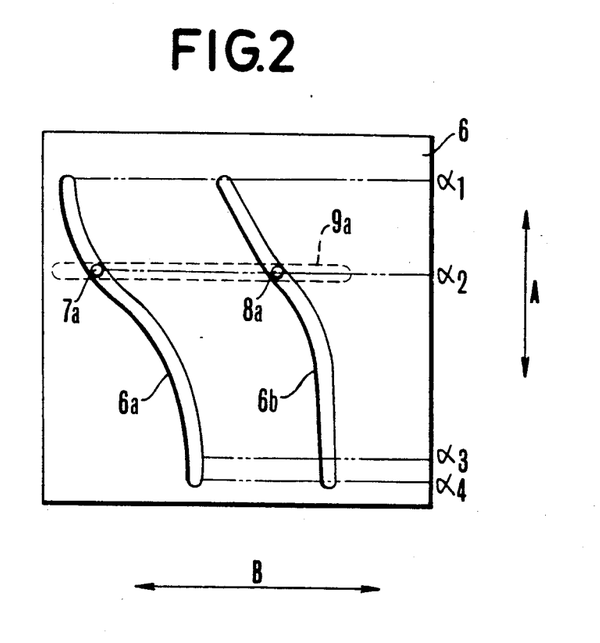
FIG. 2 is a schematic illustration of a cam ring of a zoom lens arranged according to this invention.
Figure 3A:
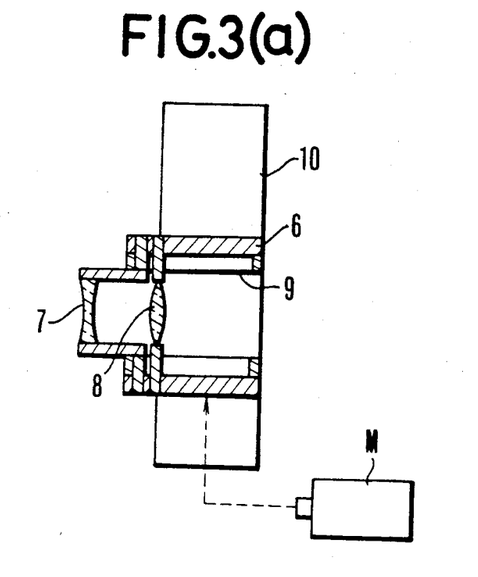
FIG. 3(a) to 3(c) show the operating states of a zoom lens having a zoom ring shown in FIG. 2.
Figure 3B:
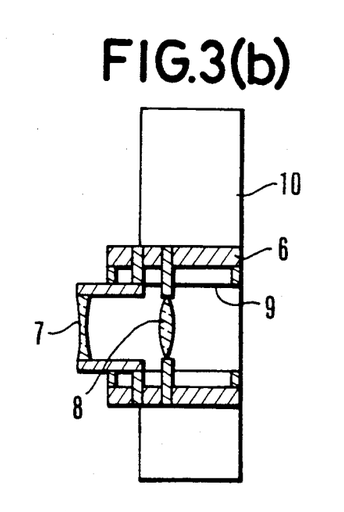
Figure 3C:
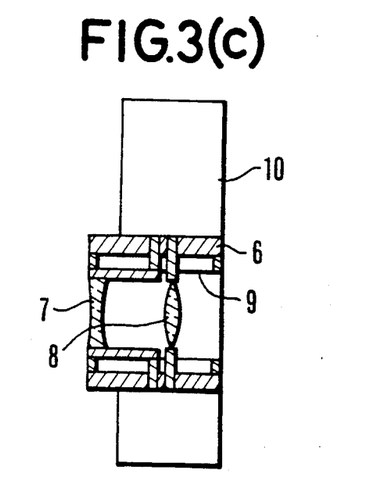

An embodiment of this invention is arranged as described in the following with reference to the accompanying drawings: In the embodiment, a zoom lens is taken up, by way of example, as the focal length variable optical system of this invention. The invention is, however, not limited to such a lens but is likewise applicable to any focal length variable optical system of other type having the focal length thereof variable stepwise. FIG. 2 shows a cam ring for the zooming operation of a zoom lens which is arranged according to this invention as a photo-taking optical system. In FIG. 2, a cam ring 6 is similar to the cam ring 4 of FIG. 1. The cam ring 6 is provided with guide cam grooves 6a and 6b. A roller 7a, which is provided at a variator, is fitted in the cam groove 6a while a roller 8a, which is provided at a compensator, is fitted in the cam groove 6b. In the same manner as in the case of FIG. 1, the rollers 7a and 8a are also fitted in the straight moving slot 9a of a straight moving barrel. When the cam ring 6 is rotated in the directions of arrow A, the variator and the compensator move in the directions of arrow B while they are being guided by the straight moving slot 9a. The cam grooves 6a and 6b are arranged to perform a zooming action by their portions between points $\alpha 1$ and $\alpha 2$. Referring to FIGS. 3(a) to 3(c), at the point $\alpha 1$, the variator 7 and the compensator 8 take their positions as shown in FIG. 3(a) relative to the camera body 10. At another point $\alpha 2$, their positions become as shown in FIG. 3(b). In FIGS. 3(a) to 3(c), a reference numeral 6 denotes the cam ring and a numeral 9 the straight moving barrel which has the straight moving slot 9a. At a region between points $\alpha 2$ and $\alpha 4$ of the cam grooves 6a and 6b as shown in FIG. 2, the barrel for the zoom lens is sunk into the camera body. When the rollers 7a and 8a move to a point $\alpha 3$, the variator 7 and the compensator 8 are stowed inside the camera body as shown in FIG. 3(c). In this specific embodiment, the zoom lens consists of two lens groups. With the variator 7 and the compensator 8 coming inside of the camera body, the whole zoom lens is stowed inside the camera body. At a region between points $\alpha 3$ and $\alpha 4$, the variator 7 and the compensator 8 no longer move and the zoom lens is kept in its barrel sunken state. While the size of a photo-taking lens is generally increased by the use of a zoom lens, the arrangement to stow the zoom lens into the camera body effectively prevents the camera from degrading in portability. In the embodiment described, the distance between the variator and the compensator, which is necessary for zooming, is arranged to become shortest at the time of stowing or sinking the barrel of the lens. The cam grooves 6a and 6b are thus arranged to bring the lens as close as possible to the film exposing plane. The zooming regions $\alpha 1$–$\alpha 2$ of the cam grooves 6a and 6b are arranged continuously from the barrel sinking regions α2-α4. Therefore the focal length of the zoom lens can be changed continuously after the lens is moved out from the camera body. This means an improvement in the operability of the camera.

Figure 4:
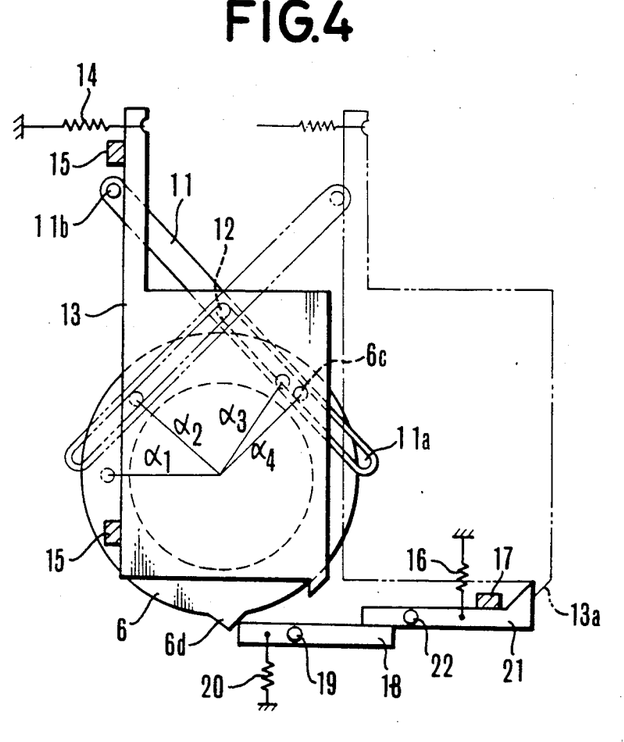
FIG. 4 shows the cam ring of FIG. 2 in relation to a barrier.

FIG. 4 shows an interlocked relation between the cam ring 6 and a barrier which is arranged to cover and protect the front surface of the zoom lens at the time of barrel sinking. In FIG. 4, the zoom lens is shown as in a barrel sunken or stowed state. The cam ring 6 of FIG. 2 is provided with a pin 6c. A transmission lever 11 is rotatable on a shaft 12 and is provided with a slot 11a. The pin 6c is fitted in the slot 11a. The lever 11 is thus arranged to swing to the left or right according as the cam ring 6 rotates. A reference numeral 13 denotes the above-stated barrier which serves as a lens protecting cover for protecting the front surface of the zoom lens in sinking the lens barrel and is slidable to the left or right. Under a barrel sinking condition as shown in FIG. 4, the barrier 13 is urged to move to the left and covers the front surface of the zoom lens by abutting on stoppers 15. The transmission lever 11 is provided with a projection 11b. When the cam ring 6 is rotated counterclockwise to shift the guiding position of the cam grooves from the point α4 to the point α2 and thus to bring the variator and the compensator forward from the inside of the camera body, the transmission lever 11 turns clockwise. The projection 11b pushes the barrier 13 to move to the right against the force of the spring 14. By this, the front surface of the zoom lens is opened. When the guiding position of the cam grooves of the cam ring 6 is shifted to the point α2, the barrier 13 comes to take a position as indicated by two-dot-chain lines. Then, a projection 13a which is provided on the lower side of the barrier 13 engages a lock lever 21 and the barrier 13 is kept in the position as shown in FIG. 4. The lock lever 21 is rotatable on a shaft 22 and is urged to turn counterclockwise by a spring 16. This causes the lever 21 to abut on a stopper 17. During the process of the shift of the barrier 13 to the two-dot-chain line position, the lock lever 21 is once pushed away by the projection 13a and then again comes to keep the barrier 13 in the two-dot-chain line position. Therefore, in carrying out a zooming operation within the region α2-α1 of the cam ring 6, the barrier 13 is kept retracted from the front surface of the zoom lens.

After completion of a photo-taking operation, when the cam ring 6 is turned round clockwise to change the zoom lens guiding position from the point α2 to the point α3, the zoom lens is stowed into the camera body as mentioned in the foregoing. Then, with the cam ring 6 further turned round clockwise to bring the zoom lens guiding position from the point α3 to the point α4, a projection 6d which is provided on the periphery of the cam ring 6 causes an interlocking lever 18 to turn counterclockwise. The lever 18 is rotatable on a shaft 19 and is urged by a spring 20 to turn counterclockwise. However, since the force of a spring 16 is stronger than that of the spring 20, the interlocking lever 18 is abutting on the lock lever 21 and remains in a position as shown in FIG. 4 under a normal condition. Whereas, when the projection 6d of the cam ring 6 causes the interlocking lever 18 to turn counterclockwise, the lock lever 21 turns clockwise against the force of the spring 16 and thus unlocks the barrier 13. This allows the barrier 13 to be slid to the left by the urging force of the spring 14. Then, the front surface of the photo-taking zoom lens is again covered by the barrier 13.

In the specific embodiment described, the zooming cam grooves and the barrel sinking cam grooves are continuously arranged in the rotary cam ring. However, it is also possible to have similar cam grooves arranged in a straight moving cam ring instead of the rotary cam ring. Further, the cam ring 6 may be arranged to be driven by driving means M such as a motor as shown in FIG. 3(a) in such a way as to automatically perform the zooming and barrel sinking operations. The zooming cam grooves and the barrel sinking cam grooves do not have to be perfectly continuous. They may be arranged to be continuous with some spacing left between them. Further, this invention is not limited to the photo-taking optical system but is also applicable to other focal length variable optical systems, such as a zoom view finder, etc. It goes without saying that this invention is not limited to the specific embodiment described. Various changes and modifications may be made without departing from the spirit or scope of the invention.

In the camera which is arranged in accordance with this invention and is provided with a focal length variable optical system, as described in the foregoing, a focal length varying guide part for varying the focal length of the photo-taking optical system and a barrel sinking guide part for stowing the optical system are continuously arranged. In photographing, the photo-taking optical system can be moved out from the inside of the camera body and the focal length thereof can be varied in a continuous manner.

The camera, therefore, permits quick photo-graphing operations and excels in operability. In addition to that advantage, the invention enhances the portability of the camera, because the photo-taking optical system which otherwise becomes large in size can be readily stowed into the camera body.

Further, in accordance with this invention, the lens protecting cover is arranged to be automatically opened and closed in association with the actions to move the photo-taking optical system out of and into the camera body. This effectively prevents the lens from being damaged when the lens protecting cover is inadvertently left open. The arrangement also obviates the necessity of manual opening and closing operation on the lens protecting cover.

What is claimed is:

1. A camera having a focal length variable optical system, comprising:
   (a) a focal length variable optical system;
   (b) a focal length varying guide part for varying the focal length of said optical system, said optical system being arranged to vary the focal length thereof by shifting its position along said guide part; and
   (c) a barrel sinking guide part extending from said focal length varying guide so as to bring said optical system into the body of the camera by continuous operation from the varying of the focal length, said optical system being arranged to be stowed into the camera body by shifting the position thereof along said barrel sinking guide part.

2. A camera according to claim 1, wherein said focal length varying guide part includes cam means.

3. A camera according to claim 1, wherein said barrel sinking guide part includes cam means.

4. A camera according to claim 1, further comprising protecting means for protecting said optical system, said protecting means being arranged to become inoperative in response to the movement of said optical system out of said camera body.

5. A camera having a focal length variable optical system, comprising:
(a) a photo-taking optical system the focal length of which is variable; and
(b) control means for varying the focal length of said photo-taking optical system and for stowing said optical system into the body of the camera, said control means including a focal length varying guide part arranged to guide said optical system for varying the focal length thereof and a barrel sinking guide part arranged to guide said optical system for stowing said optical system into said camera body, said control means being arranged such that, when said control means shifts continuously the position thereof in a given direction, said photo-taking optical system is guided by said focal length varying guide part to vary the focal length thereof and is guided by said barrel sinking guide part to be stowed into said camera body.

6. A camera according to claim 5, further comprising protecting means for protecting said photo-taking optical system, said protecting means being arranged to become inoperative in response to the position shifting action of said control means.

7. A camera according to claim 6, wherein said control means includes an auxiliary guide part which is arranged to guide said photo-taking optical system during a process of shifting said protecting means to an inoperative state.

8. A camera according to claim 7, wherein said auxiliary guide part is arranged not to change the position of said photo-taking optical system.

9. A camera according to claim 7, wherein said auxiliary guide part is arranged such that, with said control means shifting the position thereof in said given direction, said auxiliary guide part guides said photo-taking optical system after said optical system is guided by said barrel sinking guide part.

10. A camera according to claim 5, further comprising driving means for shifting the position of said control means.

11. A camera according to claim 10, wherein said driving means includes an electric motor driving device.

12. A camera according to claim 5, wherein said focal length varying guide part includes cam means.

13. A camera according to claim 5, wherein said barrel sinking guide part includes cam means.

14. A photographic camera comprising:
a photographic lens system freely settable to various focal lengths;
an openable and closeable lens cover disposed in front of said photographic lens system;
opening and closing means for said lens cover;
motor means for providing kinetic energy for the focal length changeover operations of said photographic lens system and also for the opening and closing operations of said lens cover; and
linking means capable of transmitting the kinetic energy from said motor means to said photographic lens system and to said opening and closing means in the form of a mechanical displacement;
wherein said opening and closing means operates:
to open said lens cover by utilizing a mechanical displacement from a home position to an intermediate position of said linking means;
to close said lens cover by utilizing a mechanical displacement from the intermediate position to the home position of said linking means; and
to change over a focal position by utilizing mechanical displacements reversibly between the intermediate position and an end position of said linking means.

15. A photographic camera, as defined in claim 14, wherein said linking means is linearly displaced by said motor means in the direction of the optical axis of said lens system.

16. A photographic camera, as defined in claim 14, wherein said linking means is rotatably displaced by said motor means about the optical axis of said lens system.

17. A photographic camera, as defined in claim 14, further comprising:
a first loose mechanism disposed between said linking means and said lens cover and adapted for inhibiting a predetermined amount of displacement of said linking means from being transmitted to said lens cover; and
a second loose mechanism disposed in a contact region between said linking means and said lens system and adapted for inhibiting a predetermined amount of displacement of said linking means from being substantially transmitted to said lens system to changing over the focal length of said photographic lens system.

18. A photographic camera, as defined in claim 14, wherein said lens system is capable of step-free changing over a focal length thereof.

19. A photographic camera, as defined in claim 14, wherein said lens system is capable of changing over a focal length thereof in a plurality of steps.

20. A photographic camera comprising:
a photographic lens system;
means for changing over the total focal length of said lens system;
an electrical driving means for driving said changing over means;
a lens cover movable between a position of covering a front face of said lens system and a position for uncovering said front face; and
means for transmitting the driving force of said driving means to said lens cover thereby moving said lens cover between said covering and uncovering positions.

21. A photographic camera, as defined in claim 20, wherein said changing over means includes operating means operable in a first range and in a second range by the driving force of said driving means such that said operating means changes over the focal length of said lens system by the operation in said first range and moves said lens cover through said transmitting means by the operation in said second range.

22. A photographic camera, as defined in claim 21, wherein at least a front element of said lens system is movable between a position projecting forward from a camera body and a position retracted backward from said projecting position for performing the changing over of the focal length and wherein said front element is stationed at said retracted position when said operating means is in said second range.

23. A photographic camera, as defined in claim 22, wherein said operating means is movable along an optical axis of said lens system.

24. A photographic camera, as defined in claim 22, wherein said operating means is rotatable around an optical axis of said lens system and said operating means further includes cam means for moving said lens system along said optical axis in response to the rotation of said operating means.

25. A photographic camera, as defined in claim 20, wherein said lens system is so arranged that its focal length is mutually changed over between a predetermined shorter focal length and a predetermined longer focal length.

26. A photographic camera, as defined in claim 20, wherein said lens system is so arranged that its focal length is varied continuously.

27. A photographic camera comprising:
a photographic lens system;
means for changing over the total focal length of said lens system;
lens cover means movable between positions for covering and uncovering a front face of said lens system;
motor means for providing kinetic energy; and
linking means capable of transmitting the kinetic energy from said motor means to said lens cover means for moving said lens cover means into said uncovering position in response to a mechanical displacement from a home position to an intermediate position of said linking means and for moving said lens cover means into said covering position in response to a mechanical displacement from said intermediate position to said home position of said linking means, and capable of transmitting the kinetic energy form said motor to said changing over means in response to a mechanical displacement between said intermediate position and an end position of said linking means.

28. A camera or an optical system driving device comprising:
an optical system;
varying means for varying the focal length of said optical system;
protecting cover means for protecting said optical system; and
driving means for driving said varying means and also said protecting cover means.

29. A camera or a device according to claim 28, wherein said optical system includes a photographic optical system.

30. A camera or a device according to claim 28, wherein said protecting cover means includes means for opening and closing a front face of said optical system.

31. A camera or device according to claim 28, wherein said driving means includes a motor.

32. A camera or a device according to claim 28, wherein said driving means includes displacement means for causing said varying means to operate substantially by the driving force of said driving means during displacement of said displacement means between a first position and a second position, and for causing said protecting cover means to operate substantially by the driving force of said driving means during displacement of said displacement means between said second position and a third position.

33. A camera or a device according to claim 28, wherein said driving means includes displacement means for causing said varying means to operate substantially by the driving force of said driving means during displacement of said displacement means between a first state and a second state, and for causing said protecting cover means to operate substantially by the driving force of said driving means during displacement of said displacement means between said second state and a third state.

34. A camera or device according to claim 28, wherein said driving means includes displacement means for causing said varying means to operate substantially by the driving force of said driving means during displacement of said displacement means in a first range, and for causing said protecting cover means substantially to operate by the driving force of said driving means during displacement of said displacement means in a second range.

35. A camera or a device according to claim 34, wherein said driving means includes means for inhibiting said driving means from substantially operating on said protecting cover means during the displacement of said displacement means in the first range.

36. A camera or a device according to claim 34, wherein said driving means includes means for inhibiting said driving means from substantially operating on said varying means to vary the focal length of said optical system during the displacement of said displacement means in the second range.

37. A camera or a device according to claim 34, wherein said driving means includes means for inhibiting said driving means from substantially operating on said protecting cover means during a predetermined amount of displacement of said displacement means.

38. A camera or a device according to claim 34, wherein said driving means includes means for inhibiting said driving means from substantially operating on said varying means to vary the focal length of said optical system during a predetermined amount of displacement of said displacement means.

39. A camera or a device according to claim 28, wherein said driving means includes working means for causing said varying means to operate substantially by the driving force of said driving means during operation of said working means in a first range, and for causing said protecting cover means to operate substantially by the driving force of said driving means during operation of said working means in a second range.

40. A camera or a device according to claim 39, wherein said driving means includes means for inhibiting said driving means from substantially operating on said protecting cover means during the operation of said working means in the first range.

41. A camera or a device according to claim 39, wherein said driving means includes means for inhibiting said driving means from substantially operating on said varying means to vary the focal length of said optical system during the operation of said working means in the second range.

42. A camera or a device according to claim 39, wherein said driving means includes means for inhibiting said driving means from substantially operating on said protecting cover means during a predetermined amount of operation of said working means.

43. A camera or a device according to claim 39, wherein said driving means includes means for inhibiting said driving means from substantially operating on said varying means to vary the focal length of said optical system during a predetermined amount of operation of said working means.

44. A camera or a device according to claim 28, wherein said driving means includes means for transmitting a driving force by means of a straight displacement.

45. A camera of a device according to claim 28, wherein said driving means includes means for transmitting a driving force by means of a rotation.

46. A camera or a device according to claim 28, wherein said varying means includes means for changing over the focal lengths of said optical system in a plurality of steps.

47. A camera or a device according to claim 28, wherein said varying means includes means for changing over the focal length of said optical system continuously.

48. A camera or an optical system driving device comprising:
varying means for varying the focal length of an optical system:
protecting cover means for protecting said optical system; and
driving means for driving said varying means and also said protecting cover means.

49. A camera or a device according to claim 48, wherein said optical system includes a photographic optical system.

50. A camera or a device according to claim 48, wherein said protecting cover means includes means for opening and closing a front face of said optical system.

51. A camera or device according to claim 48, wherein said driving means includes a motor.

52. A camera or device according to claim 48, wherein said driving means includes displacement means for causing said varying means to operate substantially by the driving force of said driving means during displacement of said displacement means in a first range, and for causing said protecting cover means substantially to operate by the driving force of said driving means during displacement of said displacement means in a second range.

53. A camera or an optical system operative device comprising:
an optical system;
varying means for varying the focal length of said optical system;
protecting cover means for protecting said optical system; and
operating means for operating said varying means and also said protecting cover means.

54. A camera or a device according to claim 53, wherein said optical system includes a photographic optical system.

55. A camera or a device according to claim 53, wherein said protecting cover means includes means for opening and closing a front face of said optical system.

56. A camera or a device according to claim 53, wherein said operating means includes displacement means for causing said varying means to operate substantially by said operating means during displacement of said displacement means between a first position and a second position, and for causing said protecting cover means to operate substantially by said operating means during displacement of said displacement means between said second position and a third position.

57. A camera or a device according to claim 53, wherein said operating means includes displacement means for causing said varying means to operate substantially by said operating means during displacement of said displacement means between a first state and a second state, and for causing said protecting cover means to operate substantially by said operating means during displacement of said displacement means between said second state and a third state.

58. A camera or a device according to claim 53, wherein said operating means includes displacement means for causing said varying means to operate substantially by said operating means during displacement of said displacement means in a first range, and for causing said protecting cover means to operate substantially by said operating means during displacement of said displacement means in a second range.

59. A camera or device according to claim 58, wherein said operating means includes means for inhibiting said operating means from substantially operating on said protecting cover means during the displacement of said displacement means in the first range.

60. A camera or device according to claim 58, wherein said operating means includes means for inhibiting said operating means from substantially operating on said varying means to vary the focal length of said optical system during the displacement of said displacement means in the second range.

61. A camera or a device according to claim 58, wherein said operating means includes means for inhibiting said operating means from substantially operating on said protecting cover means during a predetermined amount of displacement of said displacement means.

62. A camera or a device according to claim 58, wherein said driving means includes means for inhibiting said driving means from substantially operating on said varying means to vary the focal length of said optical system during a predetermined amount of displacement of said displacement means.

63. A camera or a device according to claim 53, wherein said operating means includes working means for causing said varying means to operate substantially by said operating means during operation of said working means in a first range, and for causing said protecting means to operate substantially by said operating means during operation of said working means in a second range.

64. A camera or a device according to claim 63, wherein said operating means includes means for inhibiting said operating means from substantially operating on said protecting cover means during the operation of said working means in the first range.

65. A camera or a device according to claim 63, wherein said operating means includes means for inhibiting said operating means from substantially operating on said varying means to vary the focal length of said optical system during the operation of said working means in the second stage.

66. A camera or a device according to claim 63, wherein said operating means includes means for inhibiting said operating means from substantially operating on said protecting cover means during a predetermined amount of operation of said working means.

67. A camera or a device according to claim 63, wherein said operating means includes means for inhibiting said operating means from substantially operating on said varying means to vary the focal length of said optical system during a predetermined amount of operation of said working means.

68. A camera or a device according to claim 53, wherein said operating means includes means for transmitting an operating force by means of a straight displacement.

69. A camera or a device according to claim 53, wherein said operating means includes means for transmitting an operating force by means of a rotation.

70. A camera or a device according to claim 53, wherein said varying means includes means for changing over the focal lengths of said optical system in a plurality of steps.

71. A camera or a device according to claim 53, wherein said varying means includes means for changing over the focal length of said optical system continuously.

72. A camera or an optical system operating device, comprising:
varying means for varying the focal length of an optical system;
protective cover means for protecting said optical system; and
operating means for operating said varying means and also said protecting cover means.

73. A camera or a device according to claim 72, wherein said optical system includes a photographic optical system.

74. A camera or a device according to claim 72, wherein said protecting cover means includes means for opening and closing a front face of said optical system.

75. A camera or a device according to claim 72, wherein said operating means includes displacement means for causing said varying means to operate substantially by said operating means during displacement of said displacement means in a first range, and for causing said protecting cover means to operate substantially by said operating means during displacement of said displacement means in a second range.

76. A camera or an optical system driving device comprising:
(A) an optical system;
(B) varying means for varying the focal length of said optical system;
(C) retracting means for retracting said optical system; and
(D) driving means for automatically driving said varying means and also said retracting means.

77. A camera or a device according to claim 76, wherein said optical system includes a photographic optical system.

78. A camera or a device according to claim 76, wherein said retracting means includes means for moving said optical system toward a camera body.

79. A camera or a device according to claim 76, wherein said varying means includes means for varying the focal length of said optical system by means of moving said optical system in a first range and said retracting means includes means for retracting said optical system by means of moving said optical system in a second range.

80. A camera or a device according to claim 79, further comprising protecting cover means for protecting said optical system, said protecting cover means substantially operating by a force of said driving means in said second range.

81. A camera or a device according to claim 76, wherein said varying means includes means for varying the focal length of said optical system by means of moving said optical system between a first position and a second position and said retracting means includes means for retracting said optical system by means of moving said optical system between said second position and a third position.

82. A camera or a device according to claim 76, wherein said varying means includes means for varying the focal length of said optical system by means of moving said optical system between a first state and a second state and said retracting means includes means for retracing said optical system by means of moving said optical system between said second state and a third state.

83. A camera or a device according to claim 76, wherein said varying means includes first guide means for varying the focal length of said optical system by means of moving said optical system a first range and said retracting means includes second guide means for retracting said optical system by means of moving said optical system in a said second range, said second guide means being arranged continuously from said first guide means.

84. A camera or a device according to claim 83, wherein said first guide means includes cam means.

85. A camera or a device according to claim 83, wherein said second guide means includes cam means.

86. A camera or a device according to claim 76, further comprising protecting cover means for protecting said optical system, said protecting cover means being drive by said driving means.

87. A camera or a device according to claim 86, wherein said protecting cover means includes means for opening and closing a front face of said optical system.

88. A camera or a device according to claim 76, wherein said driving means includes a motor.

89. A camera or a device according to claim 76, wherein driving means includes displacement means for causing said varying means to operate substantially by the driving force of said driving means during displacement of said displacement means between a first position and a second position, and for causing said retracting means to operate substantially by the driving force of said driving means during displacement of said displacement means between said second position and a third position.

90. A camera or a device according to claim 76, wherein said driving means includes displacement means for causing said varying means to operate substantially by the driving force of said driving means during displacement of said displacement means between a first state and a second state, and for causing said retracting means to operate substantially by the driving force of said driving means during displacement of said displacement means between said second state and a third state.

91. A camera or a device according to claim 76, wherein said driving means includes displacement means for causing said varying means to operate substantially by the driving force of said driving means during displacement of said displacement means in a first range, and for causing said retracting means to operate substantially by the driving force of said driving means during displacement of said displacement means in a second range.

92. A camera or a device according to claim 91, wherein said driving means includes means for inhibiting said driving means from substantially operating on said retracting means during the displacement of said displacement means in the first range.

93. A camera or a device according to claim 91, wherein said driving means includes means for inhibiting said driving means from substantially operating on said varying means to vary the focal length of said optical system during the displacement of said displacement means in the second range.

94. A camera or a device according to claim 91, wherein said driving means includes means for inhibiting said driving means from substantially operating on said retracting means during a predetermined amount of displacement of said displacement means.

95. A camera or a device according to claim 91, wherein said driving means includes means for inhibiting said driving means from substantially operating on said varying means to vary the focal length of said optical system during a predetermined amount of displacement of said displacement means.

96. A camera or a device according to claim 91, further comprising protecting cover means for protecting said optical system, said projecting cover means substantially operating by the driving force of said driving means during the displacement of said displacement means in the second range.

97. A camera or a device according to claim 76, wherein said driving means includes working means for causing said varying means to operate substantially by the driving force of said driving means during operating of said working means in a first range, and for causing said retracting means to operate substantially by the driving force of said driving means during operating of said working means in a second range.

98. A camera or a device according to claim 97, wherein said driving means includes means for inhibiting said driving means from substantially operating on said retracting means during the operation of said working means in the first range.

99. A camera or a device according to claim 97, wherein said driving means includes means for inhibiting said driving means from substantially operating on said varying means to vary the focal length of said optical system during the operation of said working means in the second range.

100. A camera or a device according to claim 97, wherein said driving means includes means for inhibiting said driving means from substantially operating on said retracting means during a predetermined amount of operation of said working means.

101. A camera or a device according to claim 97, wherein said driving means includes means for inhibiting said driving means from substantially operating on said varying means to vary the focal length of said optical system during a predetermined amount of operation of said displacement means.

102. A camera or a device according to claim 97, further comprising protecting cover means for protecting said optical system, said projecting cover means substantially operating by the driving force of said driving means during the operation of said working means in said second range.

103. A camera or a device according to claim 76, wherein said driving means includes means for transmitting a driving force by means of a straight displacement.

104. A camera or a device according to claim 76, wherein said driving means includes means for transmitting a driving force by means of a rotation.

105. A camera or a device according to claim 76, wherein said varying means includes means for charging over the focal length of said optical system in a plurality of steps.

106. A camera or a device according to claim 76, wherein said varying means includes means for changing over the focal length of said optical system continuously.

107. A camera or an optical system driving device comprising:
(A) varying means for varying the focal length of an optical system;
(B) retracting means for retracting said optical system; and
(C) driving means for automatically driving said varying means and also said retracting means.

108. A camera or a device according to claim 107, wherein said optical system includes a photographic optical system.

109. A camera or a device according to claim 107, wherein said retracting means includes means for moving said optical system toward a camera body.

110. A camera or a device according to claim 107, wherein said varying means includes means for varying the focal length of said optical system by means of moving said optical system in a first range and said retracting means includes means for retracting said optical system by means of moving said optical system in a second range.

111. A camera or a device according to claim 110, further comprising protecting cover means for protecting said optical system, said protecting cover means substantially operating by a force of said driving means in said range.

112. A camera or a device according to claim 107, wherein said varying means includes means for varying the focal length of said optical system by means of moving said optical system between a first position and a second position and said retracting means includes means for retracting said optical system by means of moving said optical system between said second position and a third position.

113. A camera or a device according to claim 107, wherein said varying means includes means for varying the focal length of said optical system by means of moving said optical system between a first state and a second state and said retracting means includes means for retracting said optical system by means of moving said optical system between said second state and a third state.

114. A camera or a device according to claim 107, wherein said varying means includes first guide means for varying the focal length of said optical system by means of moving said optical system a first range and said retracting means includes second guide means for retracting said optical system by means of moving said optical system in a said second range, said second guide means being arranged continuously from said first guide means.

115. A camera or a device according to claim 114, wherein said first guide means includes cam means.

116. A camera or a device according to claim 114, wherein said second guide means includes cam means.

117. A camera or a device according to claim 107, further comprising protecting cover means for protecting said optical system, said protecting cover means being driven by said driving means.

118. A camera or a device according to claim 117, wherein said protecting cover means includes means for opening and closing a front face of said optical system.

119. A camera or a device according to claim 107, wherein said driving means includes a motor.

120. A camera or a device according to claim 107, wherein said driving means includes displacement means for causing said varying means to operate substantially by the driving force of said driving means during displacement of said displacement means in a first range, and for causing said retracting means to operate substantially by the driving force of said driving means during displacement of said displacement means in a second range.

121. A camera or an optical system operating device comprising:
(A) a variable focal length optical system;
(B) varying means for varying the focal length of said optical system;
(C) retracting means for retracting said optical system; and
(D) operating means for operating said varying means and also said retracting means.

122. A camera or a device according to claim 121, wherein said optical system includes a photographic optical system.

123. A camera or a device according to claim 121, wherein said retracting means includes means for moving said optical system toward a camera body.

124. A camera or a device according to claim 121, wherein said varying means includes means for varying the focal length of said optical system by means of moving said optical system in a first range and said retracting means includes means for retracting said optical system by means of moving said optical system in a second range.

125. A camera or a device according to claim 124, further comprising protecting cover means for protecting said optical system, said protecting cover means substantially operating by a force of said operation means in said second range.

126. A camera or a device according to claim 121, wherein said varying means includes means for varying the focal length of said optical system by means of moving said optical system between a first position and a second position and said retracting means includes means for retracting said optical system by means of moving said optical system between said second position and a third position.

127. A camera or a device according to claim 121, wherein said varying means includes means for varying the focal length of said optical system by means of moving said optical system between a first state and a second state and said retracting means includes means for retracting said optical system by means of moving said optical system between said second state and a third state.

128. A camera or a device according to claim 121, wherein said varying means includes first guide means for varying the focal length of said optical system by means of moving said optical system in a first range and said retracting means includes second guide means for retracting said optical system by means of moving said optical system in a said second range, said second guide means being arranged continuously from said first guide means.

129. A camera or a device according to claim 128, wherein said first guide means includes cam means.

130. A camera or a device according to claim 128 wherein said second guide means includes cam means.

131. A camera or a device according to claim 128, further comprising protecting cover means for protecting said optical system, said protecting cover means being driven by said operating means.

132. A camera or a device according to claim 131, wherein said protecting cover means includes means for opening and closing a front face of said optical system.

133. A camera or a device according to claim 121, wherein said protecting cover means includes means for opening and closing a front face of said optical system.

134. A camera or a device according to claim 121, wherein said operating means includes displacement means for causing said varying means to operate substantially by said operating means during displacement of said displacement means between a first position and a second position, and for causing said protecting cover means to operate substantially by said operating means during displacement of said displacement means between said second position and a third position.

135. A camera or a device according to claim 121, wherein said operating means includes displacement means for causing said varying means to operate substantially by said operating means during displacement of said displacement means between a first state and a second state, and for causing said protecting cover means to operate substantially by said operating means during displacement of said displacement means between said second state and a third state.

136. A camera or a device according to claim 121, wherein said operating means includes displacement means for causing said varying means to operate substantially by said operating means during displacement of said displacement means in a first range, and for causing said protecting cover means to operate substantially by said operating means during displacement of said displacement means in a second range.

137. A camera or a device according to claim 136, wherein said operating means includes means for inhibiting said operating means from substantially operating on said protecting cover means during the displacement of said displacement means in the first range.

138. A camera or a device according to claim 136, wherein said operating means includes means for inhibiting said operating means from substantially operating on said varying means to vary the focal length of said optical system during the displacement of said displacement means in the second range.

139. A camera or a device according to claim 136, wherein said operating means includes means for inhibiting said operating means from substantially operating on said protecting cover means during a predetermined amount of displacement of said displacement means.

140. A camera or a device according to claim 136, wherein said operating means includes means for inhibiting said operating means from substantially operating on said varying means to vary the focal length of said optical system during a predetermined amount of displacement of said displacement means.

141. A camera or a device according to claim 136, further comprising protecting cover means for protecting said optical system, said protecting cover means substantially operating by said operating means during change of said second range.

142. A camera or a device according to claim 121, wherein said operating means includes working means for causing said varying means to operate substantially by said operating means during operation of said working means in a first range, and for causing said protecting means to operate substantially by said operating means during operation of said working means in a second range.

143. A camera or a device according to claim 142, wherein said operating means includes means for inhibiting said operating means from substantially operating on said protecting cover means during the operation of said working means in the first range.

144. A camera or a device according to claim 142, wherein said operating means includes means for inhibiting said operating means from substantially operating on said varying means to vary the focal length of said optical system during the operation of said working means in the second stage.

145. A camera or a device according to claim 142, wherein said operating means includes means for inhibiting said operating means from substantially operating on said protecting cover means during a predetermined amount of operation of said working means.

146. A camera or a device according to claim 142, wherein said operating means includes means for inhibiting said operating means from substantially operating on said varying means to vary the focal length of said optical system during a predetermined amount of operation of said working means.

147. A camera or a device according to claim 142, further comprising protecting cover means for protecting said optical system, said protecting cover means substantially operating by said operating means during operating in said second range.

148. A camera or a device according to claim 121, wherein said operating means includes means for transmitting an operating force by means of a straight displacement.

149. A camera or a device according to claim 121, wherein said operating means includes means for transmitting an operating force by means of a rotation.

150. A camera or a device according to claim 121, wherein said varying means includes means for changing over the focal lengths of said optical system in a plurality of steps.

151. A camera or a device according to claim 121, wherein said varying means includes means for changing over the focal length of said optical system continuously.

152. A camera or an optical system operating device comprising:
(A) varying means for varying the focal length of a variable focal length optical system;
(B) retracting means for retracting said variable focal length optical system; and
(C) operating means for deriving said varying means and also said retracting means.

153. A camera or a device according to claim 152, wherein said optical system includes a photographic optical system.

154. A camera or a device according to claim 152, wherein said retracting means includes means for moving said optical system toward a camera body.

155. A camera or a device according to claim 152, wherein said varying means includes means for varying the focal length of said optical system by means of moving said optical system in a first range and said retracting means includes means for retracting said optical system by means of moving said optical system in a second range.

156. A camera or a device according to claim 155, further comprising protecting cover means for protecting said optical system, said protecting cover means substantially operating by a force of said operation means in said second range.

157. A camera or a device according to claim 152, wherein said varying means includes means for varying the focal length of said optical system by means of moving said optical system between a first position and a second position and said retracting means includes means for retracting said optical system by means of moving said optical system between said second position and a third position.

158. A camera or a device according to claim 152, wherein said varying means includes means for varying the focal length of said optical system by means of moving said optical system between a first state and a second state and said retracting means includes means for retracting said optical system by means of moving said optical system between said second state and a third state.

159. A camera or a device according to claim 152, wherein said varying means includes first guide means for varying the focal length of said optical system by means of moving said optical system a first range and said retracting means includes second guide means for retracting said optical system by means of moving said optical system in a said second range, said second guide means being arranged continuously from said first guide means.

160. A camera or a device according to claim 159, wherein said first guide means includes cam means.

161. A camera or a device according to claim 159, wherein said second guide means includes can means.

162. A camera or a device according to claim 152, further comprising protecting cover means for protecting said optical system, said protecting cover means being driven by said operating means.

163. A camera or a device according to claim 162, wherein said protecting cover means includes means for opening and closing a front face of said optical system.

164. A camera or a device according to claim 152, wherein said protecting cover means includes means for opening and closing a front face of said optical system.

165. A camera or a device according to claim 152, wherein said operating means includes displacement means for causing said varying means to operate substantially by said operating means during displacement of said displacement means in a first range, and for causing said protecting cover means to operate substantially by said operating means during displacement of said displacement means in a second range.

166. A camera or an optical system operating device comprising:
(A) an optical system;
(B) varying means for varying the focal length of said optical system, said varying means including first guide means for varying the focal length of said optical system by means of moving said optical system in a first range;
(C) retracting means for retracting said optical system, said retracting means including second guide means for retracting said optical system by means of moving said optical system in a said second range, said second guide means being arranged continuously from said first guide means; and
(D) operating means for operating said varying means and also said retracting means.

167. A camera or a device according to claim 166, wherein said first guide means includes cam means.

168. A camera or a device according to claim 166, wherein said second guide means includes cam means.

169. A camera or a device according to claim 166, further comprising protecting cover means for protecting said optical system, said protecting cover means being driven by said operating means.

170. A camera or a device according to claim 169, wherein said protecting cover means includes means for opening and closing a front face of said optical system.

171. A camera or a device according to claim 166, further comprising protecting cover means for protecting said optical system, said protecting cover means substantially operating by a force of said operation means in said second range.

172. A camera or a device according to claim 166, wherein said protecting cover means includes means for opening and closing a front face of said optical system.

173. A camera or an optical system operating device comprising:
- (A) varying means for varying the focal length of said optical system, said varying means including first guide means for varying the focal length of said optical system by means of moving said optical system in a first range;
- (B) retracting means for retracing said optical system, said retracting means including second guide means for retracting said optical system by means of moving said optical system in a said second range, said second guide means being arranged continuously from said first guide means; and
- (C) operating means for operating said varying means and also said retracting means.

174. A camera or a device according to claim 173, wherein said first guide means includes cam means.

175. A camera or a device according to claim 173, wherein said second guide means includes cam means.

176. A camera or a device according to claim 173, further comprising protecting cover means for protecting said optical system, said protecting cover means being driven by said operating means.

177. A camera or a device according to claim 176, wherein said protecting cover means includes means for opening and closing a front face of said optical system.

178. A camera or a device according to claim 173, further comprising protecting cover means for protecting said optical system, said protecting cover means substantially operating by a force of said operation means in said second range.

179. A camera or a device according to claim 173, wherein said protecting cover means includes means for opening and closing a front face of said optical system.

* * * * *